Sept. 18, 1928.
L. W. MAMMEN
1,684,922
ORNAMENTAL LIGHT
Filed June 11, 1926     4 Sheets-Sheet 1
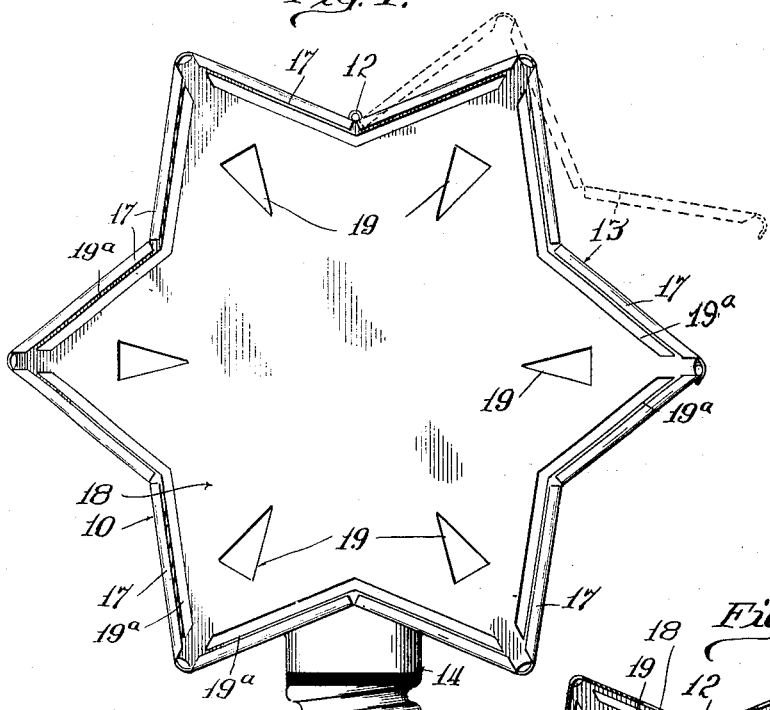
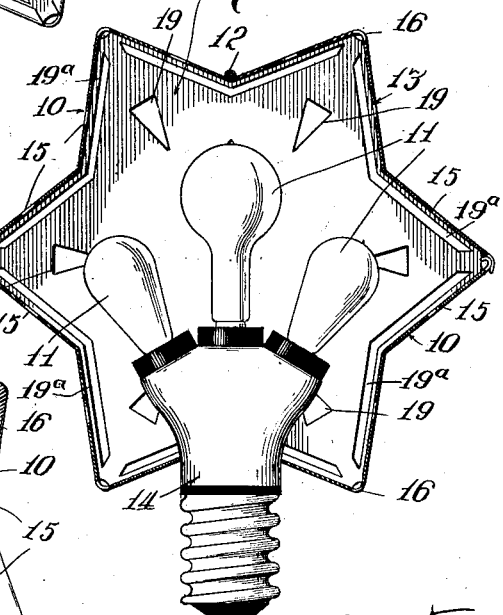
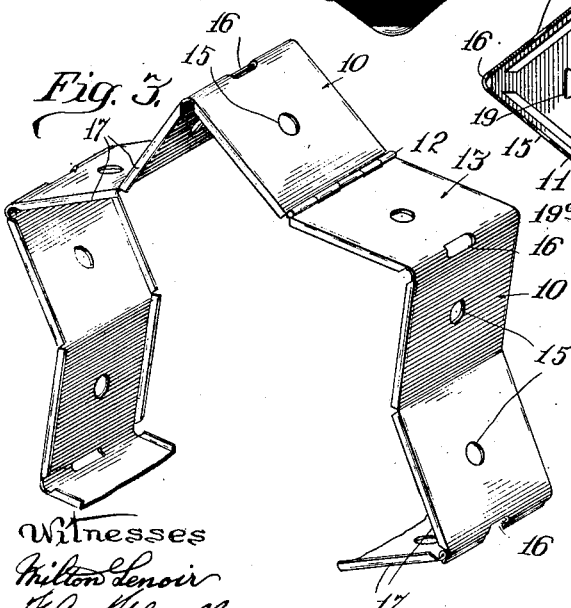

Sept. 18, 1928.
L. W. MAMMEN
ORNAMENTAL LIGHT
Filed June 11, 1926  4 Sheets-Sheet 2
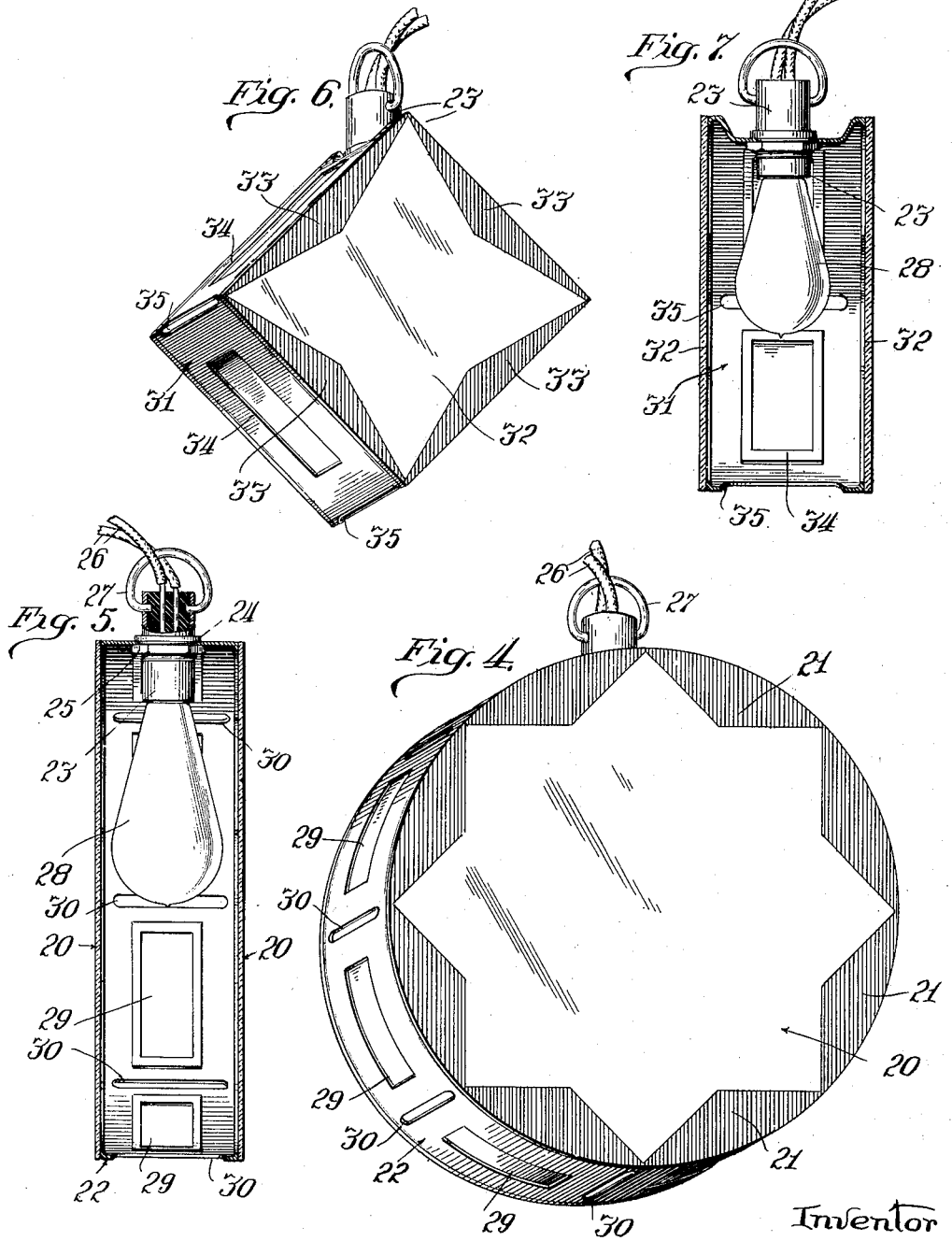

Sept. 18, 1928.  L. W. MAMMEN  1,684,922
ORNAMENTAL LIGHT
Filed June 11, 1926    4 Sheets-Sheet 3
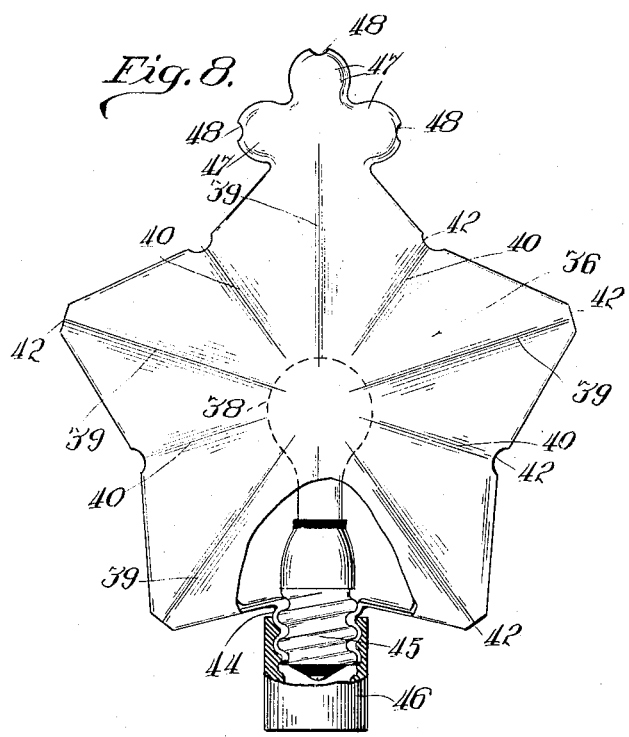
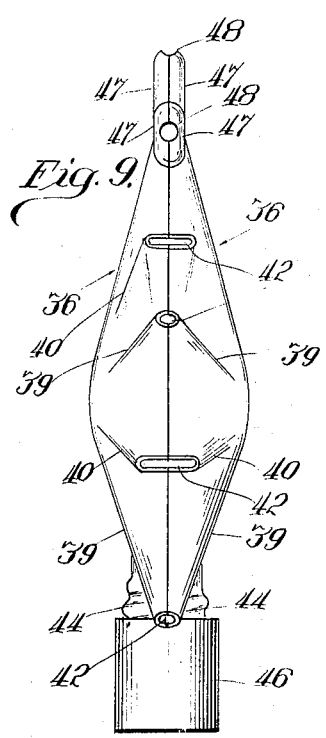
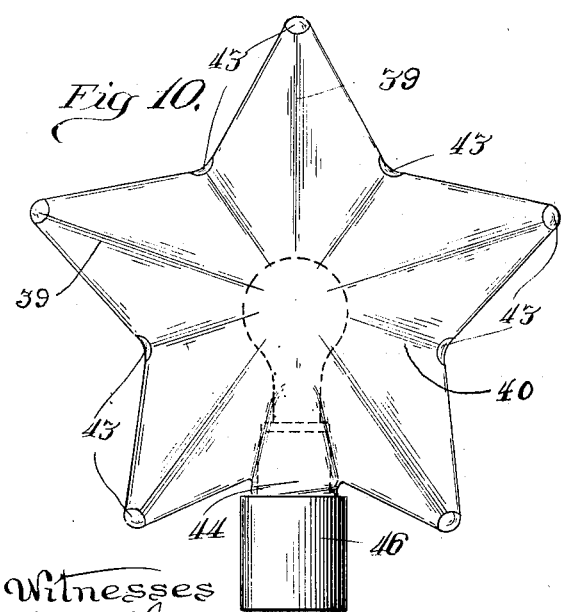
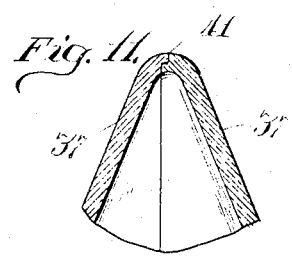

Sept. 18, 1928.  1,684,922
L. W. MAMMEN
ORNAMENTAL LIGHT
Filed June 11, 1926   4 Sheets-Sheet 4
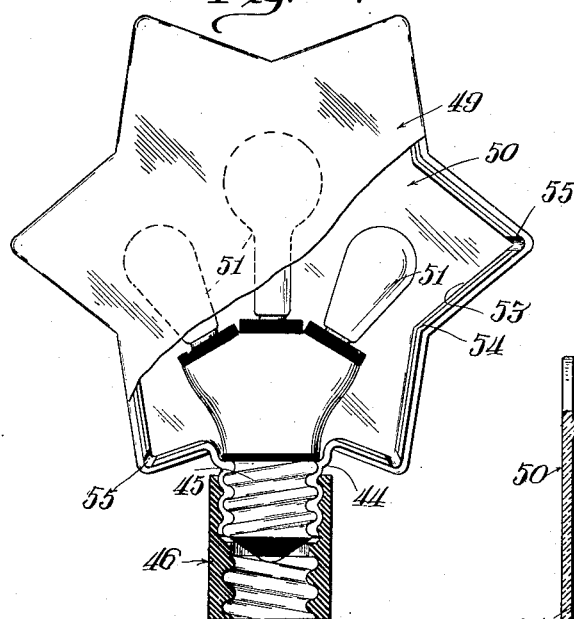
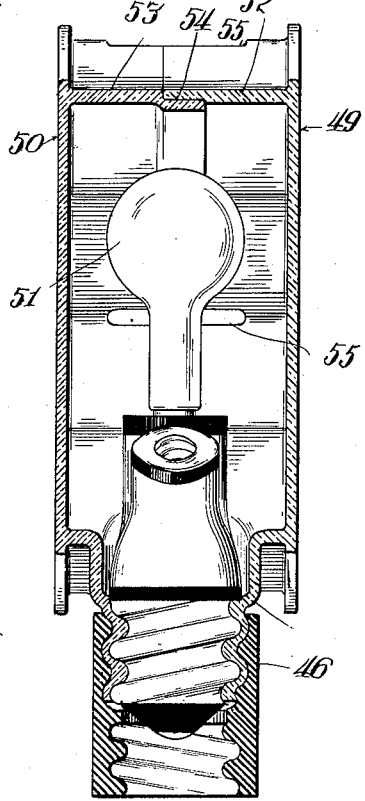
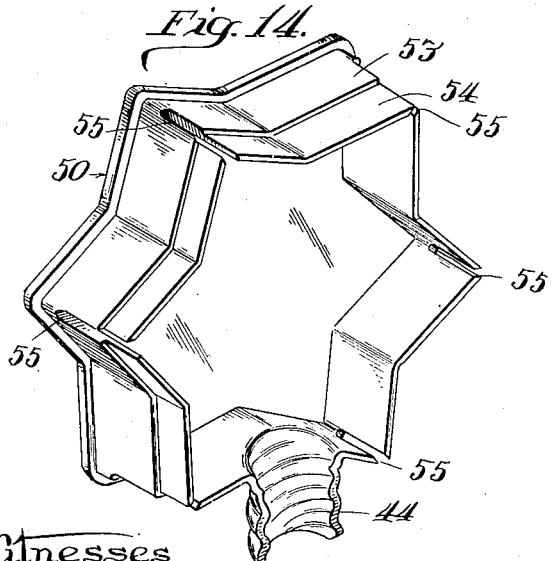
Witnesses
Milton Lenoir
Inventor
Lawrence W. Mammen,
By George Heideman
Attorney Patented Sept. 18, 1928.

1,684,922

UNITED STATES PATENT OFFICE.

LAWRENCE W. MAMMEN, OF CHICAGO, ILLINOIS.

ORNAMENTAL LIGHT.

Application filed June 11, 1926. Serial No. 115,211.

My invention has for its object the provision of a light, more especially intended for ornamental or decorative purposes, in the form of a star and particularly adapted for ornamenting Christmas trees and the like.

One object of my invention is to provide an electric light in the simulation of a star, constructed of such material and in such manner as to be comparatively cheap to manufacture; and which at the same time may be in any desired color; the objects and advantages of my invention being readily comprehended from the following detailed description of the drawings, wherein:—

Figure 1 illustrates my ornamental light in elevation, with a portion of the peripheral wall shown in open or swung out position in dotted lines.

Figure 2 is a vertical sectional elevation.

Figure 3 illustrates a portion of the peripheral wall in perspective.

Figure 4 is a perspective view of a modification of my invention.

Figure 5 is a vertical sectional view of the same.

Figure 6 is a perspective view of another form of my improved light.

Figure 7 is a vertical sectional view thereof.

Figure 8 is an elevation of a modified form of my invention, with a portion broken away and shown in section.

Figure 9 is a side view of same.

Figure 10 is an elevation of another modification.

Figure 11 is a detail sectional view taken at the juncture between the side walls of the light.

Figure 12 is a side elevation of another modified form with a portion broken away and shown in section.

Figure 13 is a vertical sectional view thereof.

Figure 14 is a detail perspective view showing one side or half of the light.

My improved ornamental light, as shown in Figures 1 to 3 of the drawings, comprises a peripheral wall 10, composed preferably of sheet metal, such as tin and the like,—an enlarged portion whereof is shown in Figure 3. The peripheral wall 10 is of a width sufficient to permit one or more small electric bulbs, shown at 11, Figure 2, to be inserted within the device, between the opposite plain faces, namely the front and rear side walls of the device.

The peripheral wall 10 is bent to define the outline of a star with any desired number of points, as for example a six-pointed star shown in the drawing. In order that proper access may be had for insertion of the bulbs 11, the peripheral wall 10 may be made in sections and the sections hingedly secured together as shown at 12, so as to permit the section 13 to be swung outwardly as shown in dotted lines in Figure 1; the free end of the hinged section being secured in place in any suitable manner; with the hinged section 13 being at the top of the light, it will remain in closed position and special fastening means need not be employed. The wall 10, preferably at a place intermediate of two star points, is secured in any suitable manner to a bulb holding plug member 14, shown threaded to screw into the usual electric socket member wired to a suitable current supply.

In the particular exemplification, the plug member 14 is shown provided with three small bulbs 11; it being understood, however, that any number of bulbs may be employed whereby suitable illumination can be obtained.

The peripheral wall 10 is provided with apertures arranged in the sloping sides of the star-points as shown at 15 and also in the apices or points of the star-points as shown at 16. The sheet metal peripheral wall 10 is also provided with the marginal flanges 17 for the purposes of maintaining the side walls 18 in place. These side walls, in the construction shown in Figures 1 and 2, are preferably of any suitable opaque material, such as sheet metal, so that the bulbs 11 are invisible. The two side walls 18, at suitable points, preferably coincident with the points of the star, are provided with cut-out portions as at 19 for outward passage of light-rays; and these side walls, adjacent to the flanges of the peripheral wall 10, are each provided with the elongated slots or openings 19ª. It is apparent that with this construction, the light-rays will pass through the cut-out portions 19 and 19ª, thereby outlining the star and also outwardly through the openings 15 and 16 so that defined radiating light-rays are provided simulating the rays of a star. Instead of employing walls of opaque material the side walls may be made of suitable translucent material if desired.

In Figures 4 and 5, I illustrate a modified form of my invention wherein the walls may be composed of paper or suitable fabric having the requisite stiffness to retain shape. In this construction, the body of the ornamental light or device is made circular, with the side walls 20 made of a suitable sheet of translucent paper (or thin glass) having the outline of a star which may be produced by tinting or painting the portions 21 intermediate of the points with an opaque paint or stain so that merely the star shape or form will be illuminated. The two side walls 20, which are similar, are united by a circular flange portion or band 22 which may be of sheet metal, cardboard, or heavy fabric material, to which the side walls may be glued or otherwise secured. The peripheral wall 22, at a suitable point, is apertured to receive the socket member 23 which may be in the form of a short tube having an integral flange 24 and an adjacent threaded portion to receive a nut 25, whereby a firm clamping relation with the peripheral wall 22 is formed. The socket member 23 has the electric lead lines 26 connected therein and the outer end of the socket member is shown provided with a suitable suspending link or loop 27. It will be understood that the socket 23 is of a type to receive a very small electric bulb which is indicated at 28 and which may be inserted in place before the walls are secured together. The construction illustrated in Figures 4 and 5 is intended to be of a more or less cheap nature so that the entire device may be discarded when the filament of the bulb burns out and therefore the device is made without regard for access to its interior. The peripheral wall 22 is shown provided with a plurality of openings 29 and 30 for the purpose of permitting passage of light from the interior in the form of defined rays; the openings 29 being shown at points coincident with the opaque portions of the side walls while the transversely disposed openings 30 are shown at points coincident with the star-point portions of the side walls. The openings 29 may be provided with a suitable colored transparent or translucent material or film for greater decorative purposes.

In Figures 6 and 7, I show another modification of my invention wherein the body of the light or device is rectangular in form; with the peripheral wall 31 made of suitable stiff material bent into the box-like form with the ends suitably secured together and apertured at a suitable point for the passage of the socket tube or member 23 which may be similar to that shown in Figure 5 and adapted to hold the electric bulb 28. The side walls 32 of the construction shown in Figures 6 and 7 may be formed of glass on which is outlined the configuration of a star, with the portion constituting the star being transparent or translucent, while the portions 33, intermediate of the points, may be stained so as to be opaque and prevent passage of light. The peripheral wall 31 is also shown provided with openings 34 and 35; the openings 34 being provided with any desired color of translucent material on film; while the openings 35 will permit the light to be emitted from the interior in defined rays at points coincident with the points of the outlined star. The side walls 32 may be secured in place and proper spaced relation in any suitable manner.

In Figures 8 and 9 I show a further modification of my invention wherein the side walls or main body of the light are intended to be made of translucent material or glass molded into star shape. The light consists of the two complementary members or side walls 36, 36 having sloping walls as shown at 37 in Figure 11, that is to say, the walls are preferably dished or cupped to provide sufficient space intermediate of the side walls at the centers thereof for an electric bulb shown at 38 in Figure 8. The side walls are preferably formed with the ridges as at 39 extending from the center and coincident with the star-points; and with the valleys or depressions 40 intermediate of the star-points, thus providing the star-points of the side walls with downwardly sloping surfaces. The peripheral edges or abutting surfaces of the two side walls are preferably rabbeted to provide matching edges as shown at 41 in Figure 11. The peripheral edges at the spaces of the star-points and coincident with the valleys or depressions 40 are provided with openings 42, as shown in Figures 8 and 9 to permit the rays of light to pass therethrough and thus produce the effect of the rays of a star. Instead of providing the openings or holes 42, the edges of the walls may be provided at similar points with clear or transparent glass as shown at 43 in Figure 10 which also causes the light to pass outwardly in ray-form; the walls of both forms being of translucent glass or other suitable material.

The two side walls of the lights shown in both Figures 8 and 10 are each provided, preferably at points intermediate of two star-points, with semi-cylindrical hubs 44, spirally corrugated as shown to provide internal and external threads when the matching sides are assembled. The internal threads are for the purpose of receiving the threaded plug 45 of the electric bulb 38; while the external threads are adapted to receive the internally threaded thimble or ferrule 46, through which the feed lines or electric wires (not shown) pass. As is apparent, when the thimble or ferrule 46 is completely screwed on the composite boss or hub 44, the side walls with the bulb will all be firmly held in place, as a shifting of the side walls on each other will be prevented by the rabbeted relation.

In the form shown in Figures 8 and 9, one of the points of the light, namely the upwardly directed point, terminates in the three clover-leaf like lobes 47, which are somewhat in simulation of a cross; the outer perimeters at central points being also preferably provided with small light passages or openings as at 48, to permit emission of small rays of light in a right angular direction or manner. It is understood, of course, that each side wall is provided with matching leaf like lobes as shown in Figure 9; and that these lobes, like the body portion, are preferably made of translucent glass or other suitable material which permits illumination without having the lighting element visible.

In Figures 12 to 14 another modification is shown, wherein the light (also in star-shape) consists of two side walls 49, 50, preferably formed with flat, outer surfaces and also of translucent glass or other suitable material, so that the lighting element or electric bulbs shown at 51 are invisible.

The walls 49, 50 are both formed with laterally disposed peripheral walls or flanges 52, 53, disposed toward each other; the flange 53 having its outer or free end slightly off-set as shown at 54 to fit beneath or within flange 52 of side wall member 49; the off-set thus providing a shoulder against which the free end of flange 52 abuts, as shown in Figure 13. This construction maintains the proper spaced relation of the side walls and at the same time prevents shifting in a direction parallel to the plane of the side walls.

Each side wall, like those in Figures 8 and 10, are likewise provided with a semi-cylindrical hub 44, spirally corrugated or threaded internally and externally to provide a suitable socket adapted to match and receive the threaded plug of the bulb holding socket member 45; while the outer corrugation or thread receives the internally threaded thimble or ferrule 46, which holds th matching side walls in place.

In this form, the flanges 52 and 53 are shown provided with matching slots or openings 55 preferably arranged coincident with the star-points; the openings permitting outward passage of light-rays.

My improved lights are more especially intended for Christmas tree ornamentation and the like and various forms have been devised which will be inexpensive in manufacture; all of the constructions not only providing an illuminated portion in simulation of a star, but also inducing the light to pass downwardly in defined rays and thereby greatly enhancing the decorative effect of the light. It is apparent that any design of star may be employed as the device permits of variations without, however, departing from the spirit of my invention.

What I claim is:

1. An ornamental light of the character described comprising two complementary side wall members formed in simulation of a star, the perimeters of the side walls being disposed toward each other and arranged in interengaging relation, the perimeters of the walls at predetermined points being formed to permit outward passage of light-rays, each side wall being provided with a semi-cylindrical hub adapted to provide a bulb-holding socket, and a member encircling the hub portions of both wall members.

2. An ornamental light of the character described comprising two complementary side walls formed in simulation of a star, the perimeters of the walls being kerfed and disposed toward each other in interengaging relation, portions of walls being formed to permit direct outward passage of light-rays, each wall being provided at registering points with a radially disposed semi-cylindrical hub externally threaded, and an internally threaded ferrule adapted to screw onto the juxtaposed hubs of both side walls.

3. An ornamental light of the character described, comprising two side wall members formed in simulation of a star, with the upwardly disposed point terminating in cross-like formation, the perimeters of both members being disposed toward each other in interengaging relation, both members at a point diametrically opposite to the cross-like formation being provided with a radially disposed semi-cylindrical hub, internally and externally threaded, a bulb-holding plug engaging the internal threads, and an internally threaded ferrule engaging the outer threads of the hub, the wall members at predetermined points being formed to permit direct outward passage of light-rays in a radial manner.

4. An ornamental light of the character described composed of two non-integral side walls of translucent material formed in simulation of a star, the walls adjacent to their perimeters having abutting portions adapted to maintain the side walls in spaced relation to provide a bulb-receiving chamber therebetween, the perimeters at the points of the star-shaped walls being formed to permit outward passage of light in the form of separate rays, radially disposed bulb-socket forming portions, and means whereby the side walls and socket forming portions are secured together.

5. An illuminated star comprising two side walls of translucent material of star shape, in bulged spaced relation toward the center to provide a lighting element receiving chamber, the perimeter of the walls at the star-points being each provided with an opening for passage of the light-rays therethrough, the perimeter of the walls at a predetermined point being provided with a bulb and a plug holding socket.

LAWRENCE W. MAMMEN.